US012223141B1

(12) United States Patent
Sun et al.

(10) Patent No.: US 12,223,141 B1
(45) Date of Patent: Feb. 11, 2025

(54) TOUCH PANEL MISTOUCH RECOGNITION

(71) Applicant: STMicroelectronics International N.V., Geneva (CH)

(72) Inventors: Guodong Sun, Beijing (CN); Yue Ding, Beijing (CN); Yuan Yun Wang, New Taipei (TW)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 0 days.

(21) Appl. No.: 18/446,122

(22) Filed: Aug. 8, 2023

(51) Int. Cl.
*G06F 3/041* (2006.01)
*G06F 3/044* (2006.01)
*G06F 3/047* (2006.01)
*G06V 40/12* (2022.01)
*G06V 40/13* (2022.01)

(52) U.S. Cl.
CPC ........ *G06F 3/04186* (2019.05); *G06F 3/0412* (2013.01); *G06F 3/044* (2013.01); *G06V 40/12* (2022.01); *G06V 40/1306* (2022.01); *G06F 3/047* (2013.01)

(58) Field of Classification Search
CPC ...... G06F 3/04186; G06F 3/044; G06F 3/047; G06V 40/12; G06V 40/1306
See application file for complete search history.

(56) References Cited

U.S. PATENT DOCUMENTS

| | | | | |
|---|---|---|---|---|
| 9,582,102 B2 * | 2/2017 | Setlak | | G06F 3/0412 |
| 10,627,955 B2 * | 4/2020 | Ko | | G06F 3/0446 |
| 10,915,194 B2 * | 2/2021 | Zhu | | G06F 3/047 |
| 10,977,470 B1 | 4/2021 | Chang | | |
| 11,232,282 B2 | 1/2022 | Cheng | | |
| 11,270,095 B2 | 3/2022 | Shih et al. | | |
| 2011/0050619 A1 * | 3/2011 | Griffin | | G06F 3/044 |
| | | | | 345/174 |

(Continued)

FOREIGN PATENT DOCUMENTS

| | | |
|---|---|---|
| CN | 111552399 A | 8/2020 |
| CN | 113238704 A | 8/2021 |
| WO | 2022156174 A1 | 7/2022 |

*Primary Examiner* — Ariel A Balaoing
(74) *Attorney, Agent, or Firm* — Slater Matsil, LLP

(57) ABSTRACT

An example gesture detection method includes detecting at a first time a first touch on a touch panel, where the first touch covers a first area of the touch panel, and then determining whether the first touch is within a track region that surrounds a fingerprint sensing region. The method includes determining whether the first touch is within the fingerprint sensing region, the fingerprint sensing region including a sensing surface of a fingerprint sensor. The method includes determining a first fraction of the fingerprint sensing region covered by the first touch and determining whether the first fraction exceeds a first threshold. The first threshold is a majority of the fingerprint sensing region. The method includes determining a second fraction of all of the first area that is within the fingerprint sensing region and determining whether the second fraction exceeds a second threshold, where the second threshold is a fraction indicative of a majority of an area associated with the corresponding touch. The method includes based on determining that the second fraction exceeds the second threshold, determining whether the first touch is valid.

20 Claims, 9 Drawing Sheets

(56) References Cited

U.S. PATENT DOCUMENTS

| | | | |
|---|---|---|---|
| 2012/0062488 A1* | 3/2012 | Lin | G06F 3/04186 |
| | | | 345/173 |
| 2013/0106776 A1* | 5/2013 | Park | G06F 3/04883 |
| | | | 345/173 |
| 2014/0098059 A1* | 4/2014 | Ichikawa | G06F 3/0416 |
| | | | 345/174 |
| 2014/0340321 A1* | 11/2014 | Chang | G06F 3/0418 |
| | | | 345/173 |
| 2015/0212724 A1* | 7/2015 | Manba | G06F 3/0484 |
| | | | 715/794 |
| 2019/0294296 A1* | 9/2019 | Zhang | G06F 3/0481 |
| 2021/0209329 A1 | 7/2021 | Bjerre et al. | |
| 2022/0187978 A1* | 6/2022 | Kim | G01K 3/005 |
| 2023/0161442 A1* | 5/2023 | Heo | G06F 3/045 |
| | | | 345/174 |
| 2023/0409145 A1* | 12/2023 | Wu | G06F 3/04186 |

* cited by examiner

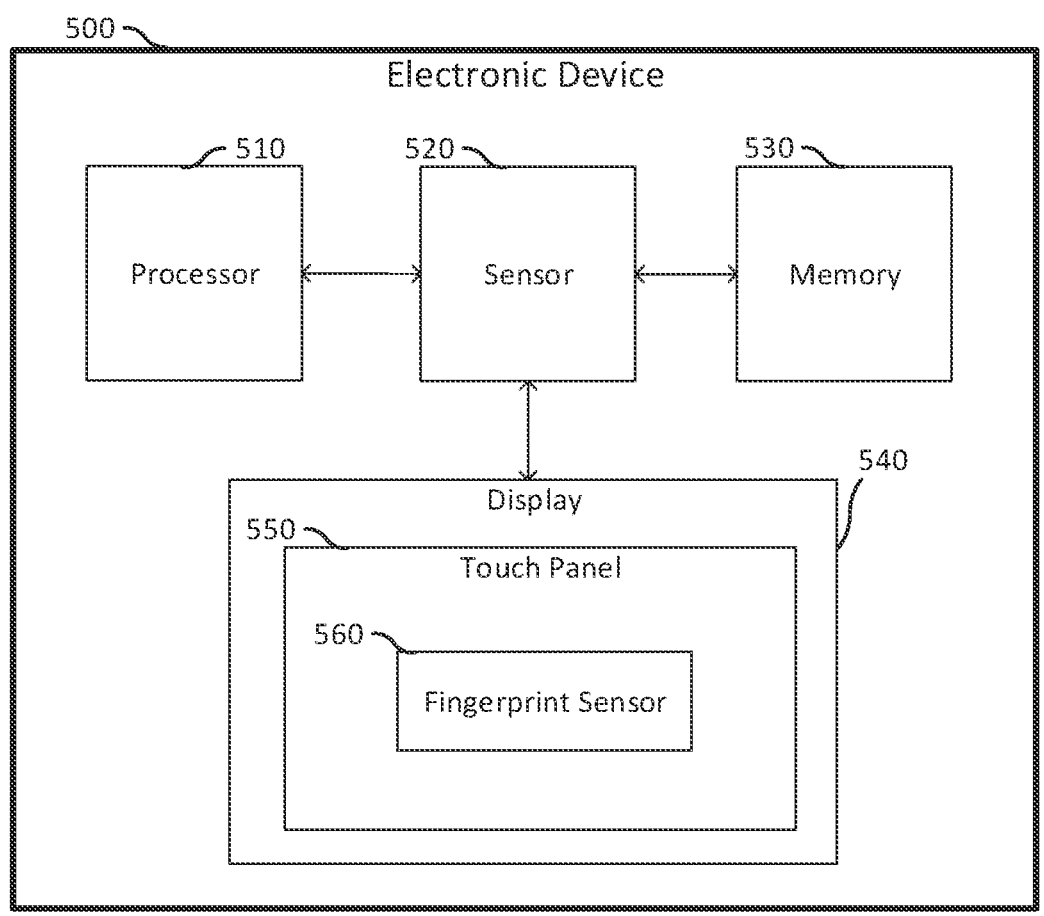

TOUCH PANEL MISTOUCH RECOGNITION

TECHNICAL FIELD

The present invention relates generally to a system and method for touch detection, and, in particular embodiments, to a systems and methods for touch panel mistouch recognition.

BACKGROUND

Gestures such as a touch may be detected by various devices, for example, including a touch panel. Capacitive touch sensing has become one of the means of detecting a user's touch on such devices. Since the human body is a good conductor, when a portion of the human body (e.g., a fingertip) approaches a capacitive touch panel, a capacitance generated between a transparent electrode of the capacitive touch panel and the human body can vary due to an electrostatic effect. By measuring a capacitance variation of a sensing line on the capacitive touch panel, a position of a touch point is determined.

In typical capacitive touch panels, a touch event is generally determined to be triggered by a finger or a palm of the user according to an area size of a press or touch by the user.

However, in some devices, a user's unintended touch may be registered as a touch or gesture of the user. That is, some unintended touches may be registered as a touch on the touch panel that controls some functionality of the device (e.g., to scan a fingerprint on a fingerprint sensor located on the touch panel). For example, when a user operates the capacitive touch panel, although the user generally touches the touch panel through a small-area fingertip, the user is also liable to press the touch panel through a finger pulp (e.g., the edge of the finger, or the entire end of the finger and not just the tip of the finger) to produce a large-area press. Moreover, when the user unintentionally puts their palm on the touch panel, generally, the palm is not totally attached to the touch panel to generate a real large-area touch, but only a side part of the little finger or a tendon part of the thumb contacts the touch panel. Although these touch areas are greater than the touch area of the fingertip, they are not necessarily greater than a touch area of the finger pulp. Therefore, if only the area size of the touch is used to determine whether the touch event is triggered by the finger or by the palm, it is hard to accurately determine whether the touch event is a meaningful touch. Consequently, meaningless touches cannot be effectively filtered out, and it is hard to implement a real mistouch rejection function.

SUMMARY

In an embodiment, a gesture detection method includes detecting at a first time a first touch on a touch panel, where the first touch covers a first area of the touch panel. The method includes determining whether the first touch is within a track region that surrounds a fingerprint sensing region; and in response to determining that the first touch is within the track region, determining whether the first touch is within the fingerprint sensing region, the fingerprint sensing region including a sensing surface of a fingerprint sensor. The method includes in response to determining that the first touch is within the fingerprint sensing region, determining a first fraction of the fingerprint sensing region covered by the first touch and determining whether the first fraction exceeds a first threshold. The first threshold is a majority of the fingerprint sensing region. The method includes in response to determining that the first fraction exceeds the first threshold, determining a second fraction of all of the first area that is within the fingerprint sensing region and determining whether the second fraction exceeds a second threshold, where the second threshold is a fraction indicative of a majority of an area associated with the corresponding touch. The method includes based on determining that the second fraction exceeds the second threshold, determining whether the first touch is valid.

In an embodiment, an electronic device includes a touch panel and a fingerprint sensor, and a processor coupled to a memory storing a program comprising instructions to be executed in the processor. The instructions when executed cause the processor to detect a first touch on a touch panel, the first touch covering a first area of the touch panel. The program includes instructions to define a track region that surrounds a fingerprint sensing region on the touch panel, and determine whether the first touch is within the track region that surrounds the fingerprint sensing region. The program includes instructions to in response to determining that the first touch is within the track region, determine whether the first touch is within the fingerprint sensing region, where the fingerprint sensing region includes a sensing surface of a fingerprint sensor. The program includes instructions to in response to determining that the first touch is within the fingerprint sensing region, determine a first fraction of the fingerprint sensing region covered by the first touch and determine whether the first fraction exceeds a first threshold, the first threshold being a majority of the fingerprint sensing region, and in response to determining that the first fraction exceeds the first threshold, determine a second fraction of all of the area that is within the fingerprint sensing region and determine whether the second fraction exceeds a second threshold. The second threshold is a fraction indicative of a majority of an area associated with the corresponding touch. The program includes instructions to based on determining that the second fraction exceeds the second threshold, determine whether the first touch is valid.

It is to be understood that both the foregoing general description and the following detailed description are exemplary and explanatory only and are not restrictive of the disclosure, as claimed.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a component schematic diagram of the electronic device in accordance with some embodiments.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Technologies that have both a touch panel and a fingerprint sensor (e.g., smartphones, tablets, some laptop computers, etc.) experience difficulties with being activated from a sleep state due to a mistaken touch. For example, the device may be awoken from a battery saving sleep state by an involuntary, or unintentional touch (called mistouch) that occurs near or on the fingerprint sensor of the electronic device. These types of involuntary touch events may occur in numerous ways. One type of unintentional touch event may occur when an object repeatedly contacts the electronic device (e.g., when the electronic device is stored with the object in a purse or pocket). Another type of involuntary touch event might occur when a user's palm covers a large area of the electronic device's touch panel and fingerprint sensor. In another type of involuntary touch, a large conductive material/object may contact the touch panel and cover the fingerprint sensor. Embodiments of the disclosure described herein implement a gesture detection method that is capable of filtering mistouch events and overcome the above described and other issues.

The inventors of this application have identified that a conventional gesture detection method is limited in the ability to identify mistouch events. In other words, current gesture detection methods do not reject certain mistouch events in a way to conserve power consumption of the electronic device. Accordingly, embodiments are described in more detail that detect mistouch events and prevent the activation of the device while in sleep mode, and thereby conserve battery.

According to various embodiments of the present disclosure, this application relates to a gesture detection method that is capable of detecting mistouch events for electronic devices that incorporate a touch panel and a fingerprint sensor. The gesture detection method filters touch events and classifies the event as either being a valid attempt to potentially wakeup the electronic device from a sleep state, or an invalid attempt to wakeup the electronic device. When the touch event is classified to be an invalid attempt, the device continues to be in the sleep state.

Figure 6:
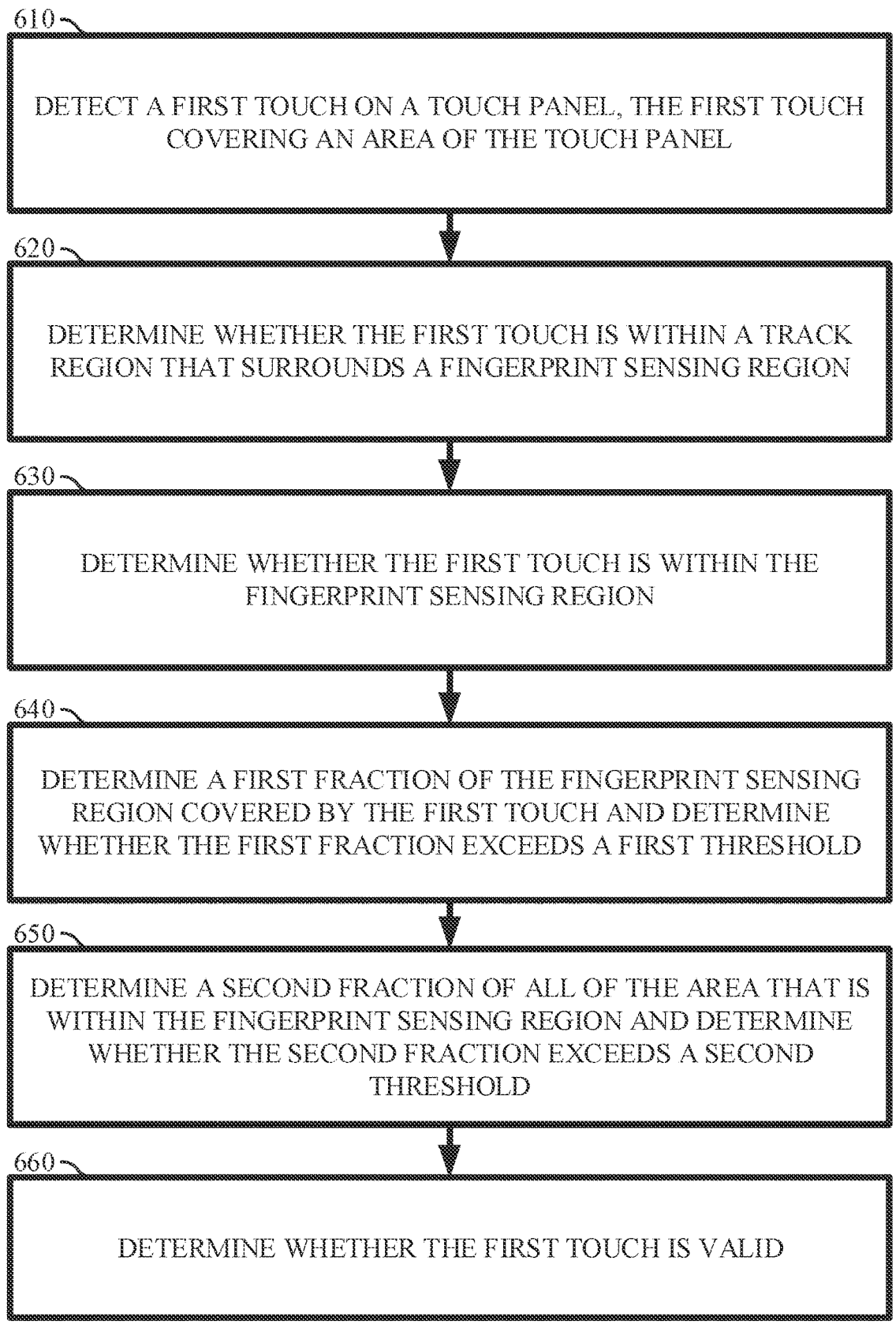
FIG. 6 illustrates a flow chart illustrating a method for operating the gesture detection system in accordance with some embodiments.

More details of the embodiments will be described below using the flow charts of FIGS. 2A-2B and 6. A schematic of a system embodiment will be described using FIG. 5.

Figure 1A:
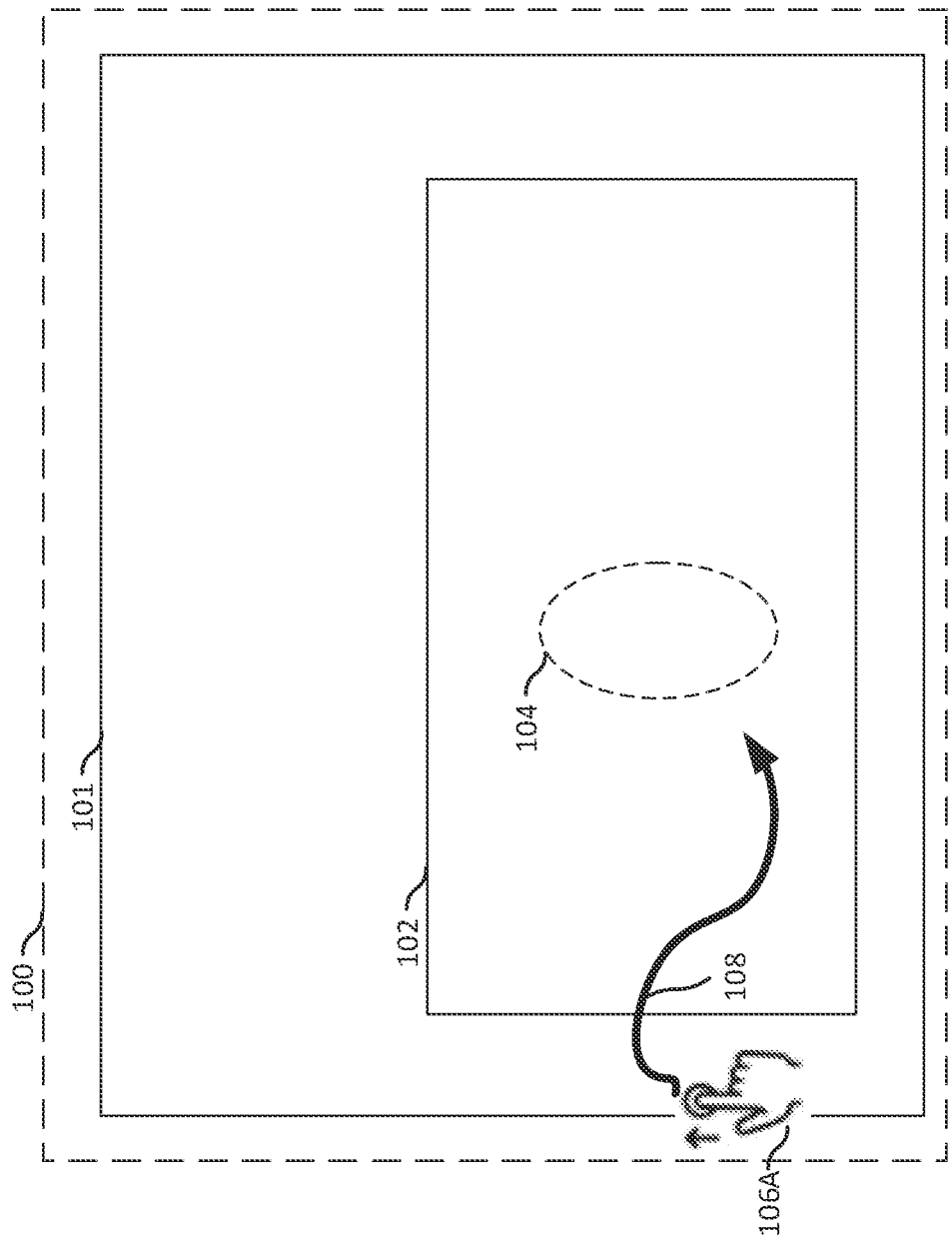
FIGS. 1A-1C are schematic diagrams of different types of touch events for an electronic device in accordance with some embodiments.
Figure 1B:
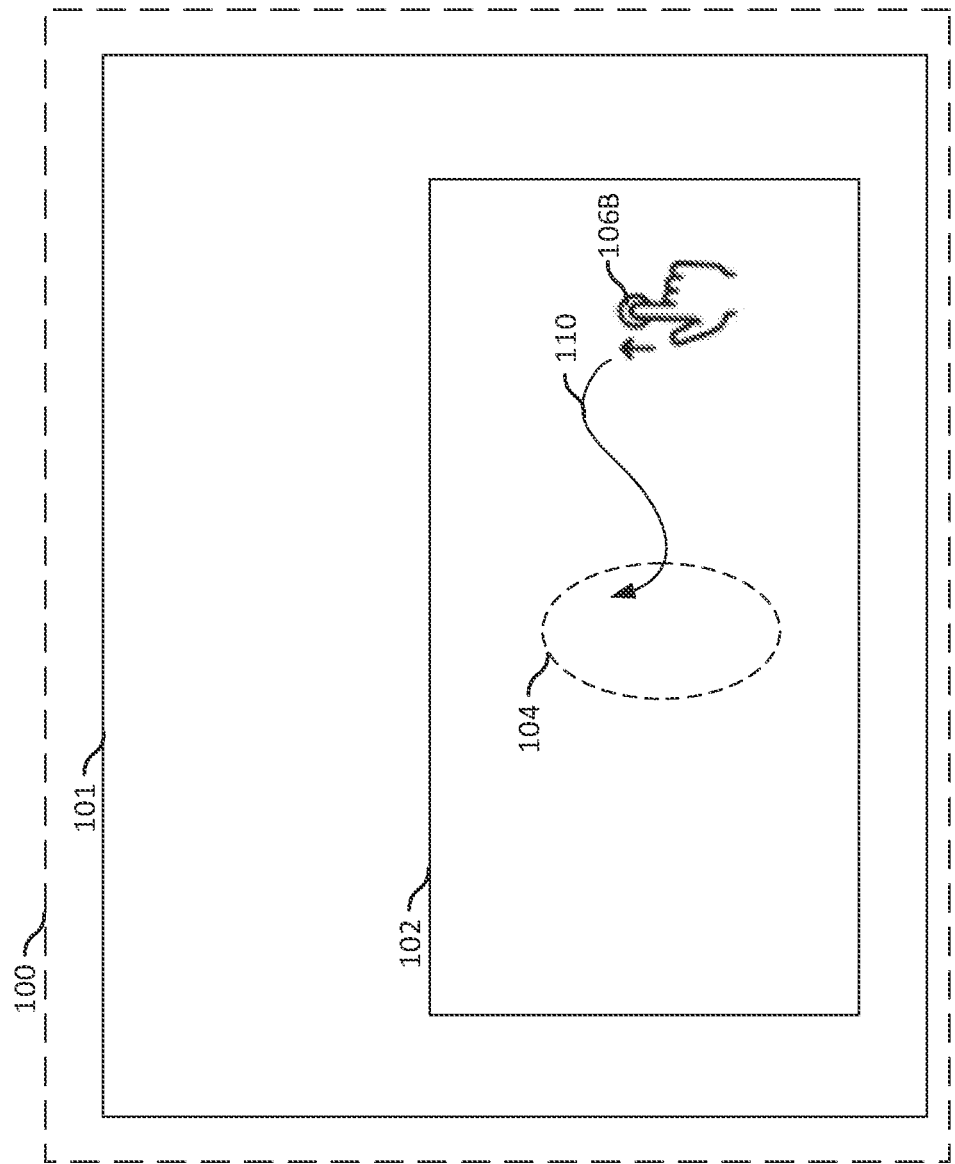
Figure 1C:
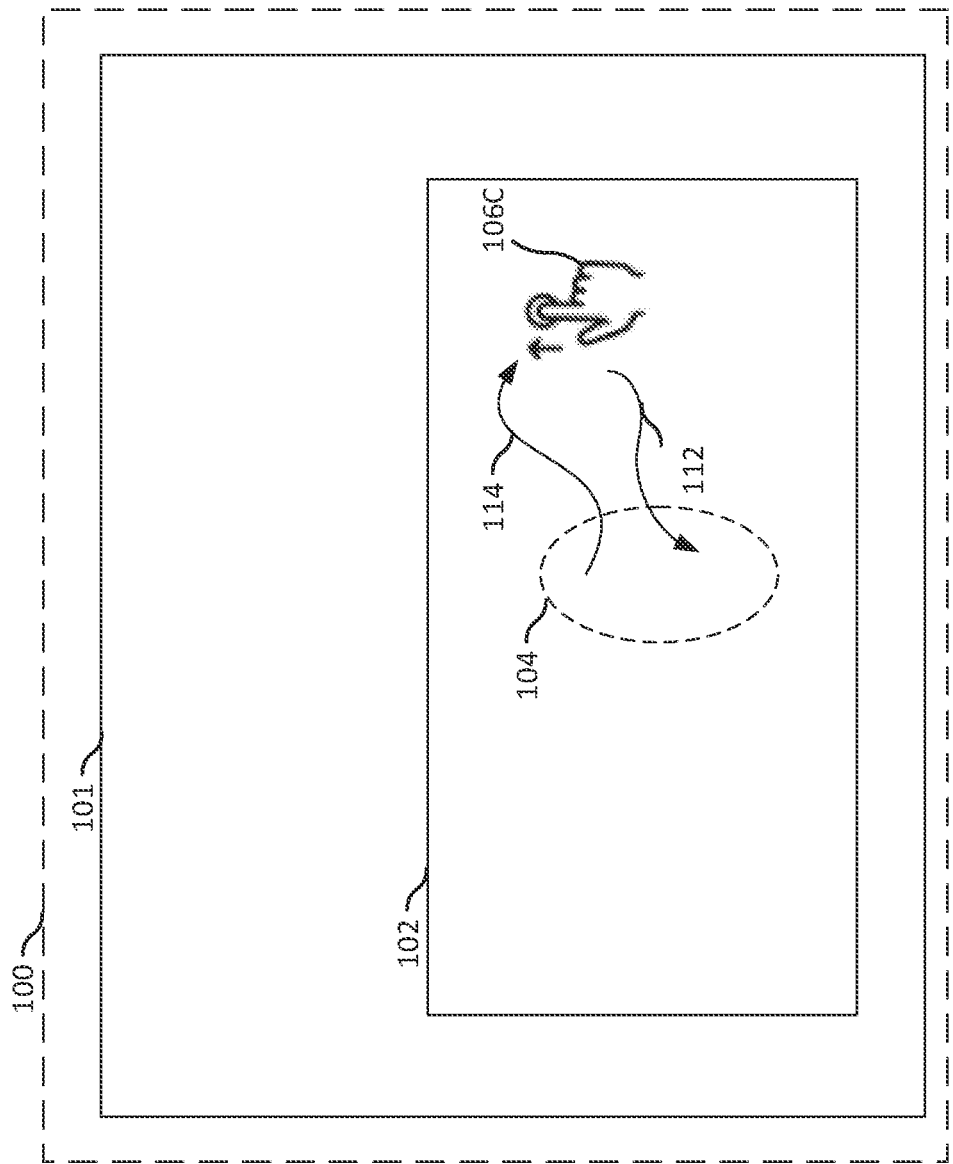

FIGS. 1A-1C illustrate three different scenarios to distinguish between a valid touch attempt and an erroneous contact with the touch sensor in accordance with embodiment of this disclosure.

As illustrated in FIG. 1A as an example, the electronic device 100 has a touch panel 101 with a fingerprint sensing region 104.

Embodiments of this application may be applied with any type of touch panel. In one or more embodiments, the touch panel 101 may comprise a resistive touch panel. The resistive touch panel may comprise multiple layers, including a flexible top layer and a rigid bottom layer, separated by tiny insulating dots. When pressure is applied to the top layer, the top layer contacts the bottom layer, causing a change in electrical current and pinpointing the touch location. In one or more embodiments, the touch panel 101 may comprise a capacitive touch panel. The capacitive touch panel may include a transparent conductive layer that stores electrical charge. When a conductive object, like a finger, touches the screen, it disrupts the electrostatic field, enabling the touch location to be detected. In one or more embodiments, the touch panel 101 may comprise an optical touch panel. The optical touch panel may use infrared light sensors placed around the screen edges. When the touch interrupts the infrared beams, the sensors detect the interruption and identifies the touch location. In one or more embodiments, the touch panel 101 may comprise a surface acoustic wave touch panel, which relies on ultrasonic waves sent across the screen surface. When a touch disrupts the waves, the receiving transducers detect the change, determining the precise touch position. These diverse touch panel technologies cater to different applications and offer users intuitive and interactive input methods.

The fingerprint sensing region 104 includes the input/output surface for a fingerprint sensor. The fingerprint sensing region 104 may, in various embodiments, may comprise any type of fingerprint sensor that provides positional information. In certain embodiments, the fingerprint sensing region 104 may obtain positional information from the touch sensing layer of the touch panel 101 rather than the fingerprint sensor. In various embodiments, the fingerprint sensor may be a capacitive scanner, ultrasonic scanner, thermal scanner, optical scanner, and combinations thereof. A capacitive scanner measures the electrical charge differences caused by the ridges and valleys of the fingerprint. When a finger touches the scanner, the capacitive sensor detects these differences and creates an electronic image. The ultrasonic scanner employs ultrasonic waves to map the unique fingerprint pattern. These scanners emit ultrasonic pulses that bounce back differently depending on the ridges and valleys, forming a detailed 3D image of the fingerprint. The thermal scanner detects the heat pattern left by the ridges of a fingerprint. They use an array of tiny thermal sensors to measure the temperature variations and create a thermal image. The optical scanner utilizes light to capture an image of the fingerprint. When a finger is placed on the scanner's surface, the light illuminates the ridges and valleys, and the reflected pattern is then captured by a digital camera. In all these types, the captured fingerprint data is compared to a stored database for identification or authentication purposes.

Ideally, when the user does not use the device, the device is put into sleep or inactive mode so as to consume less resources. When a user wants to wake up the device, the user's finger contacts the fingerprint sensing region 104 and in response the device switches to an active state. Ideally, the electronic device has no other contact and the user does not contact the fingerprint sensing region 104 otherwise. However, in actual field use, many different scenarios arise. The user could accidentally contact the fingerprint sensing region 104 while removing contents from the purse, and/or a third object could contact the fingerprint sensing region 104. In fact, these contacts could happen not just within the fingerprint sensing region 104 but also outside on other parts of the touch panel 101 of the electronic device 100. Embodiments of the application disclosure discussed further in more detail describe different ways to detect erroneous contacts so that the electronic device is not brought back into active mode, which would drain battery without providing improved performance to the user. Using embodiments of this disclosure, the erroneous contacts are detected and therefore can prevent activating the electronic device and thereby improve battery life. Instead of looking at each touch individually, embodiments of this application review a series of touches within a time window to ascertain an intent of the user and thereby more accurately activate the electronic device only when intended.

Referring again to FIG. 1A, the electronic device 100 has a touch panel 101 with a track region 102 defined around a fingerprint sensing region 104. The track region 102 may be about 2× to 10× the dimensions of the fingerprint sensing region 104 in various embodiments. The method is triggered when the user contacts the touch panel 101. If there is no contact with the touch panel 101, the touch panel will remain in a low power mode.

FIG. 1A illustrates a touch event 106, which is a series of touch sensing measurements obtained by the touch panel 101 over a time window. During this touch event 106, an object contacts the touch panel and appears to move along a first path 108 without crossing the fingerprint sensing region 104. The first instance of the touch in the time sequence occurs outside the track region 102 and the finger never enters the fingerprint sensing region 104. Based on reviewing the series of touches over the time window, it is clear that the user did not intend to activate the device. If the user had intended to activate the device, they would have directly accessed the fingerprint sensing region 104. Hence, in this scenario, the gesture detection method would determine that this finger touch is invalid. Once it is determined to be an invalid touch, there is no attempt to wakeup the electronic device.

FIG. 1B is a diagram illustrating a specific type of touch event that has mistouches made to the panel while, for example, the user tries to locate the fingerprint sensor according to an embodiment of the invention.

Unlike the prior scenario, the second touch event 106B in the time sequence originates within the track region 102, and then moves along an example second path 110 into the fingerprint sensing region 104. As described above, the gesture detection method may be triggered when the user contacts the track region 102, i.e., a touch is detected in the track region 102. Based on reviewing the series of touches over the time window for the second touch event 106B, it is likely that the user did intend to activate the device but did not locate the fingerprint sensing region 104 right-away. Since the first touch was within the track region 102, in this scenario, the gesture detection algorithm determines that this finger touch is valid. FIG. 1B depicts this scenario where the event has moved through the flow chart of FIG. 2 to box 216, and then subsequently passes the coordinate and area check of box 216.

FIG. 1C is a diagram illustrating a specific type of touch event addressed in the gesture detecting method capable of filtering panel mistouches according to an embodiment of the invention.

FIG. 1C illustrates another scenario in which the user's touch follows a different path. Again, once a touch is detected in the track region 102, the touch panel 101 identifies a third touch event 106C. The third touch event 106C illustrates that the touch originates inside the track region 102, moves along an example third path 112 into the fingerprint sensing region 104, and then follows another example fourth path 114 back out of the fingerprint sensing region 104 and into the track region 102. Based on reviewing the series of touches over the time window for the third touch event 106C, it is likely that the user did not intend to activate the device but rather the finger accidentally crossed the fingerprint sensing region 104.

Therefore, in this scenario, the gesture detection method determines that this finger touch is again invalid. FIG. 2A depicts the scenario of FIG. 1C where an event has moved through the flow chart to box 216, but then fails the coordinate and area check of box 216 (as a result of the touch moving back out of the fingerprint sensing region 104), and then moves along the path to box 218, the INVALID STATE block.

All of the above scenarios may be addressed by the gesture detection method that is capable of filtering panel mistouches. The gesture detection method may be implemented as the flowchart depicted in FIG. 2A in an embodiment.

Figure 2A:
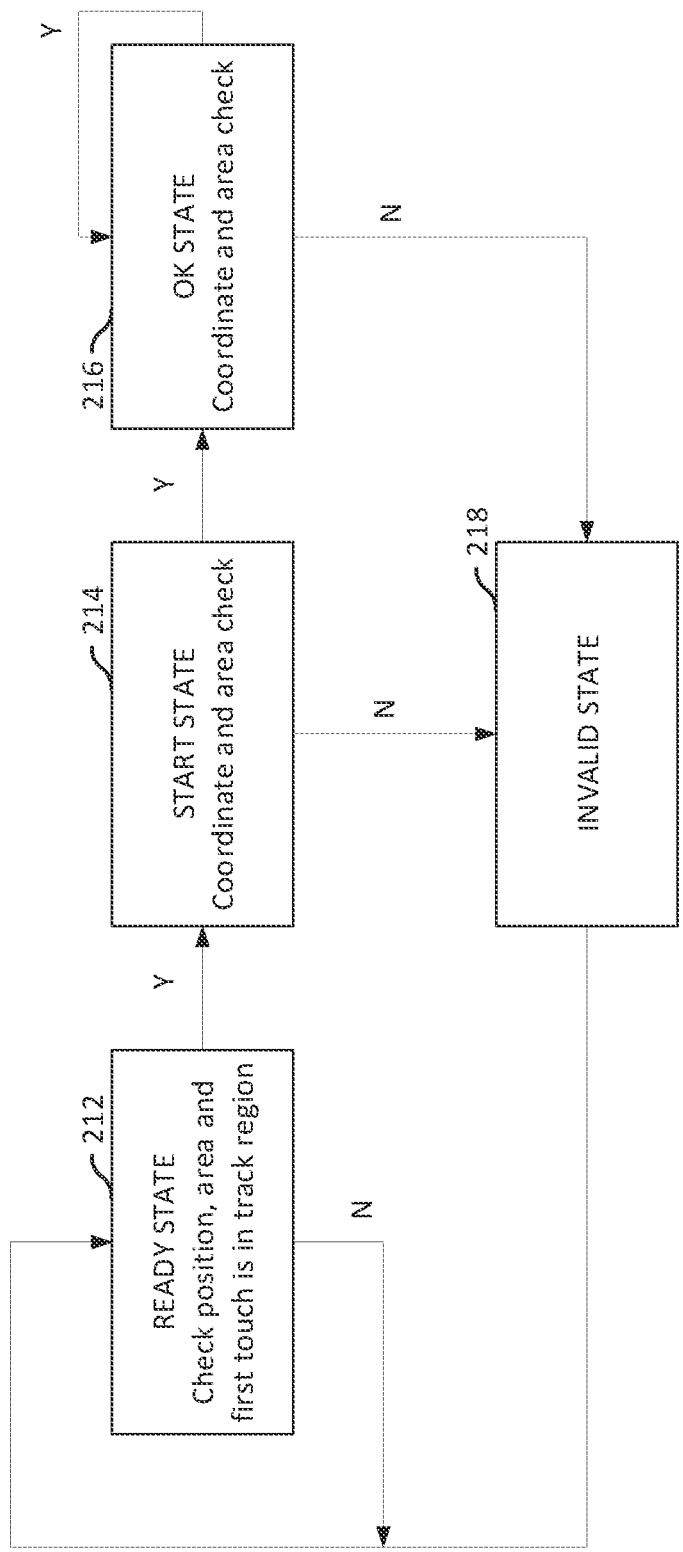
FIG. 2A is a detailed flowchart of an improved gesture detecting method capable of filtering panel mistouch according to some embodiments.

FIG. 2A is a flowchart illustrating a gesture detecting method capable of filtering panel mistouch according to an embodiment of the invention.

According to the method, whether a touch event is a valid or invalid touch is determined based on coordinate and area checks of a track region that surrounds a fingerprint sensing region. Touches that are first detected outside of the track region are deemed invalid, while touches that are first detected within the track region are further analyzed to determine whether they are valid. As described previously, the gesture detecting method of the present disclosure may be applied to various touch panels, for example, capacitive touch panels, resistive touch panels, and infrared touch panels, etc. The gesture detection method of the present disclosure may also be applied to various fingerprint sensors, for example, optical scanners, capacitive scanners, ultrasonic scanners, etc.

Invalid or inadvertent touches may be unintentionally caused by a user, for example, by putting his/her palm on the touch panel in a large area, or contacting the touch panel through a side part of the user's little finger or a tendon part of user's thumb with a small area, or contacting the touch panel by a separate object when the electronic device is stored in a container (e.g., a purse or pocket), or it may even occur in the case that a large amount of fluid or conductive objects contact the touch panel.

The gesture detection method filters touch events by first defining a track region that surrounds a fingerprint sensing region of the electronic device. The method then waits for a touch event to occur on the touch panel of the electronic device. Once a touch event is detected on the electronic device, the gesture detection method then goes through multiple steps to determine a set of coordinates of the touch event, and an area covered by the touch. If the touch event is determined to have coordinates that are within the track region of the electronic device, the gesture detection method then continues to determine whether the coordinates of the touch are within the fingerprint sensing region.

If the coordinates of the touch event are determined to be within the fingerprint sensing region, the gesture detection method then makes use of the area covered by the touch event to help filter mistouch events. If the majority of the fingerprint sensing region is covered by the area of the touch event, and the majority of the area of the touch event is confined to the fingerprint sensing region (meaning there is not a large amount of area of the track region covered by the touch event), then the touch event would be labeled as a valid attempt to unlock the electronic device.

The gesture detection method of this embodiment benefits through the inclusion of three specific scenarios. The first of the specific scenarios occurs when a touch event is first detected outside of the track region of the electronic device and then moves into the track region. This type of touch event would be labeled as an invalid attempt to wakeup the electronic device because a user rarely, if ever, would make a touch event of this scenario with the intention of waking the electronic device. The second of the specific scenarios occurs when a touch event originates within the track region and then moves into the fingerprint sensing region. This scenario would be labeled as a valid attempt to wakeup the electronic device because this scenario does typically occur. And the third of the specific scenarios included in the gesture detection method occurs when a touch event originates inside of the fingerprint sensor region, moves out into the track region, and then moves back into the fingerprint sensing region of the electronic device. This type of touch event would be labeled as an invalid attempt to wakeup the electronic device because a user would very rarely, if ever, make these sequences of touches in an attempt to wake the electronic device.

Referring to FIG. 2A, a flow of a gesture detecting method capable of filtering panel mistouches in an embodiment is schematically illustrated. The gesture detection method of FIG. 2A can be described as a state machine with four possible states: a READY STATE, a START STATE, an OK STATE, and an INVALID STATE. As a touch event is processed through the gesture detecting method of FIG. 2A, multiple coordinate and area checks are made that will cause the state machine to change to other states. The state machine, whenever there is no touch detected on the touch panel, stays waiting in the READY STATE for a touch to occur.

Beginning at the READY STATE, the gesture detection method waits for a touch to occur on the touch panel of the electronic device. A touch event is constructed and updated as the touch event is processed through the gesture detection method and the states are changed. When a touch occurs on the touch panel, a new touch event is started and the gesture detection method checks the coordinates and area of this first touch on the touch panel. The system scans the touch panel for as long as a touch persists on the touch panel after a set timeframe has elapsed (e.g., 10 milliseconds). The touch event then has the coordinates and area of the first touch stored in it. If the coordinates of the first touch of the touch event are found to be within the track region, and the coordinate and area checks have their conditions satisfied, the state machine will then move to the START STATE, where the touch panel will be scanned again (the scan that occurs after the elapsed timeframe) for a second touch to be compared to the first touch of the touch event.

When a coordinate check is made, for the touch to pass the coordinate check, the touch must have coordinates that are within the fingerprint sensing region. If the touch passes the coordinate check condition, the area check is made. When an area check is made, for the touch to pass the area check, the area of the fingerprint sensing region must be sufficiently covered by the touch's area, and the area covered by the touch must have most of its area confined to the fingerprint sensing region. According to the area check of the system, a large-area touch is most likely caused by a situation that the user unintentionally puts their palm on the touch panel, such a touch event may be directly determined as a meaningless touch, and a set of touch coordinates are not reported. Both the coordinate check and the area check are further described in discussions of FIG. 3 and FIG. 4A-4C, where example touches are depicted in the figures.

If the touch event's first touch is out of the track region, the touch event is deemed invalid, the touch event's information is cleared from memory, and the flow stays in box 212 (the READY STATE) to detect subsequent touch events (as explained using FIG. 1A). If the first touch of the touch event is within the track region, and coordinate and area checks fail, the touch event is also deemed invalid, the touch event's information is cleared from memory, and the flow stays in box 212 to detect subsequent touch events (as explained using FIG. 1A).

If the determination result of the box 212 is negative (e.g., fails the area check, or the touch is removed), it represents that the sensed touch does not sufficiently cover the fingerprint sensing region. For example, this could be because the user has inadvertently touched the screen near the fingerprint sensing region, but did not intentionally put the finger directly or sufficiently within the fingerprint sensing region (this is the case depicted in FIG. 1A), or that the sensed touch includes relatively large areas (this case is depicted in FIG. 1C) that are not within the fingerprint sensing region (e.g., the user's palm or some other conductive object has touched the screen, with only a small portion of the object being within the fingerprint sensing region). In other words, the touch area is either too small within the fingerprint sensing region or is too large outside of the fingerprint sensing region, so the touch event is determined to be an inadvertent or invalid touch. On the other hand, the touch may be deemed valid if the area checks are passed (this case is depicted in FIG. 1B). If the touch is determined to be a valid touch by passing both the coordinate and area checks, this moves the system to box 214 to the START STATE.

Once the state has changed to the START STATE, a new scan of the touch panel is made and a second touch has its coordinates and area information determined. The second touch is not necessarily a new touch, but the same touch that might have moved on the touch panel. To determine if the second touch is a new touch or not, additional processing steps are made to compare the overlap of the area covered by the first touch with the area covered by the second touch. This new set of touch coordinates and touch area that are scanned in the START STATE are stored in the touch event along with the first touch's information. The coordinate and area checks are then made on the second touch of the touch event, and if the conditions of the coordinate and area check are met and there is a large overlap of the areas of the first and second touch (e.g., larger than 90% of the same area is covered), the touch event is deemed valid and the state machine will change to the OK STATE (box 216).

If a determination result of box 214 is negative (e.g., fails the area check, or the touch is removed), the system is moved to the INVALID STATE (box 218). This state waits for the removal of the touch from the touch panel and once the touch has been removed, the touch event information is cleared from memory, and the system moves back to box 212 (the READY STATE) and waits for a new touch on the touch panel.

If a determination result of box 214 is affirmative, and there is a large overlap of the areas of the first and second touch (e.g., larger than 90% of the same area is covered), the system proceeds to the OK STATE (box 216). In the OK STATE, a third set of touch coordinates and touch area are found by scanning the touch panel again (during the subsequent scan that occurs after the timeframe has elapsed), and this third touch's information is stored in the touch event along with the first and second touch information.

If the third set of touch coordinates and touch area found by scanning the touch panel again passes the coordinate and area checks and there is a large overlap of the areas of the second and third touch (e.g., larger than 90% of the same area is covered), the host may be woken up from a sleep state (e.g., to unlock the electronic device). Should the touch be removed from the fingerprint sensor region during the time the method is within box 216 (in the OK STATE), the system will determine that the unlock attempt is invalid and stop the process of waking up the device. The system will then proceed to the INVALID STATE (box 218), where it will wait for the touch removal (in the case that the area check failed), and then proceed back to box 212 and wait for a touch to occur on the touch panel of the electronic device.

To reiterate, once the state machine is in the OK STATE, the third touch stored in the touch event has the coordinates and area checks performed. If the coordinate and area checks have their conditions passed, and there is a large overlap of the areas of the second and third touch (e.g., larger than 90% of the same area is covered), the checks of the OK STATE are passed. If the checks of the OK STATE are passed, a wakeup signal may wake the host up to potentially unlock the electronic device using the fingerprint scanner.

If the checks of the OK STATE are not all passed, the state machine moves to the INVALID STATE, where the same procedure detailed above for when the state machine moves to the INVALID STATE may be implemented.

The gesture detection method described above and illustrated in FIG. 2A occurs over a timeframe of approximately 10 milliseconds per scan. If a touch event makes it through to the OK STATE of the gesture detection method, there have been three touch scans made. This scenario would correspond to the gesture detection method taking approximately 30 milliseconds in total to determine the validity of the touch event's intention to wakeup the electronic device. There are other ways that the gesture detection method of FIG. 2A can be implemented, and one such implementation is described next.

Figure 2B:
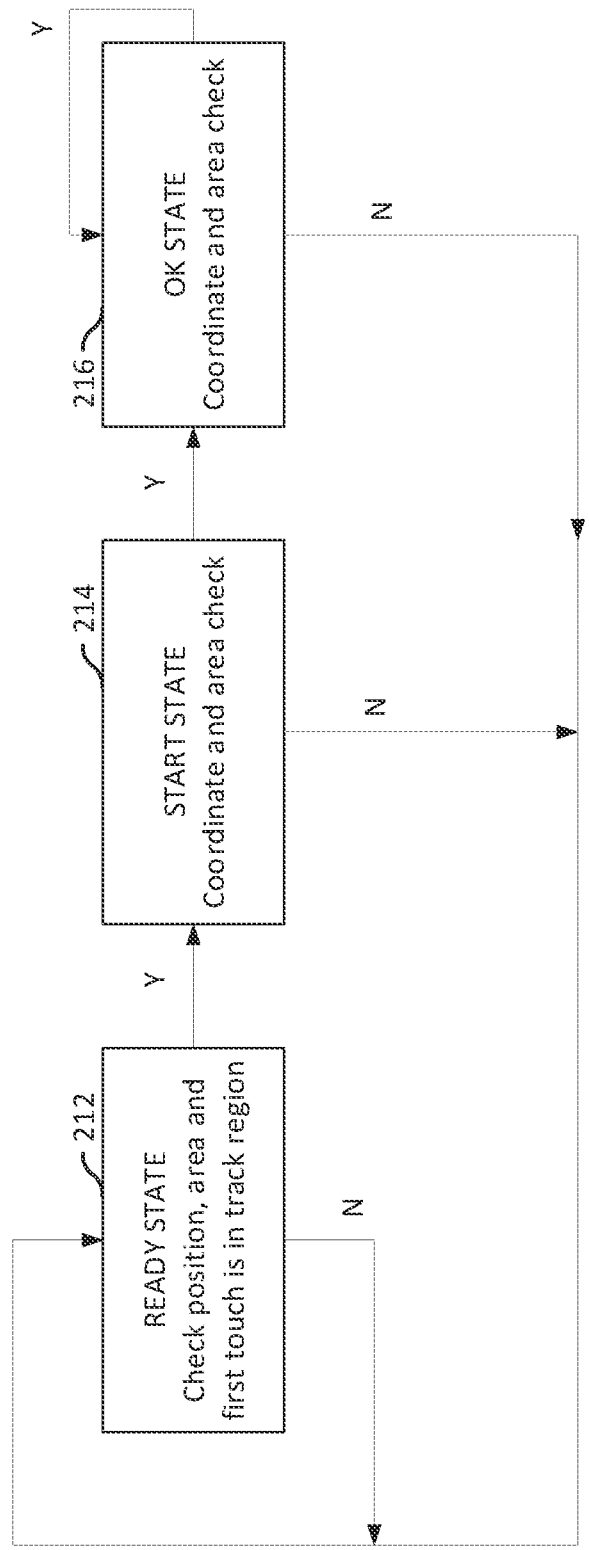
FIG. 2B is also a detailed flowchart of an improved gesture detecting method capable of filtering panel mistouch according to some embodiments.

Referring to FIG. 2B, what is schematically illustrated is another example of a flow of a gesture detecting method capable of filtering panel mistouches in an embodiment. FIG. 2B includes all of the same steps as FIG. 2A, except for box 218 (the INVALID STATE). In place of using the INVALID STATE box of FIG. 2A, FIG. 2B incorporates a state machine composed of only three states: a READY STATE, a START STATE, and an OK STATE. Rather than the state machine moving into the INVALID STATE as a result of a failure of the checks performed in the START STATE, or the OK STATE, the gesture detection method of FIG. 2B would simply move the state back to the READY STATE without the added steps of the INVALID STATE.

For the sake of brevity, the rest of the flowchart of FIG. 2B will not be detailed because the steps are the same as FIG. 2A, except for what has already been detailed above. The gesture detection method depicted in the flowchart of FIG. 2B will take approximately the same amount of time as the implementation depicted in the flowchart of FIG. 2A.

FIG. 3 and FIG. 4A-4C are diagrams illustrating both the coordinate (FIG. 3) and area (FIG. 4A-4C) checks that are performed during the gesture detection method flowchart depicted in FIGS. 2A-2B. The coordinate check is intended to ensure that any potential touch on the touch area is within the fingerprint sensor region and is accomplished by checking the coordinates determined for the touch event. The area check is intended to check the amount of area overlap that occurs within the fingerprint sensor region, as well as the track region defined around the fingerprint sensor region. This check is intended to rule out events that could be an accidental touch from a palm or some other large area object. If too much of the track region is covered by a potential touch event, the touch would be labeled invalid as a result of being determined to originate from an object too large to be classified as a finger attempting to unlock the electronic device.

Figure 3:
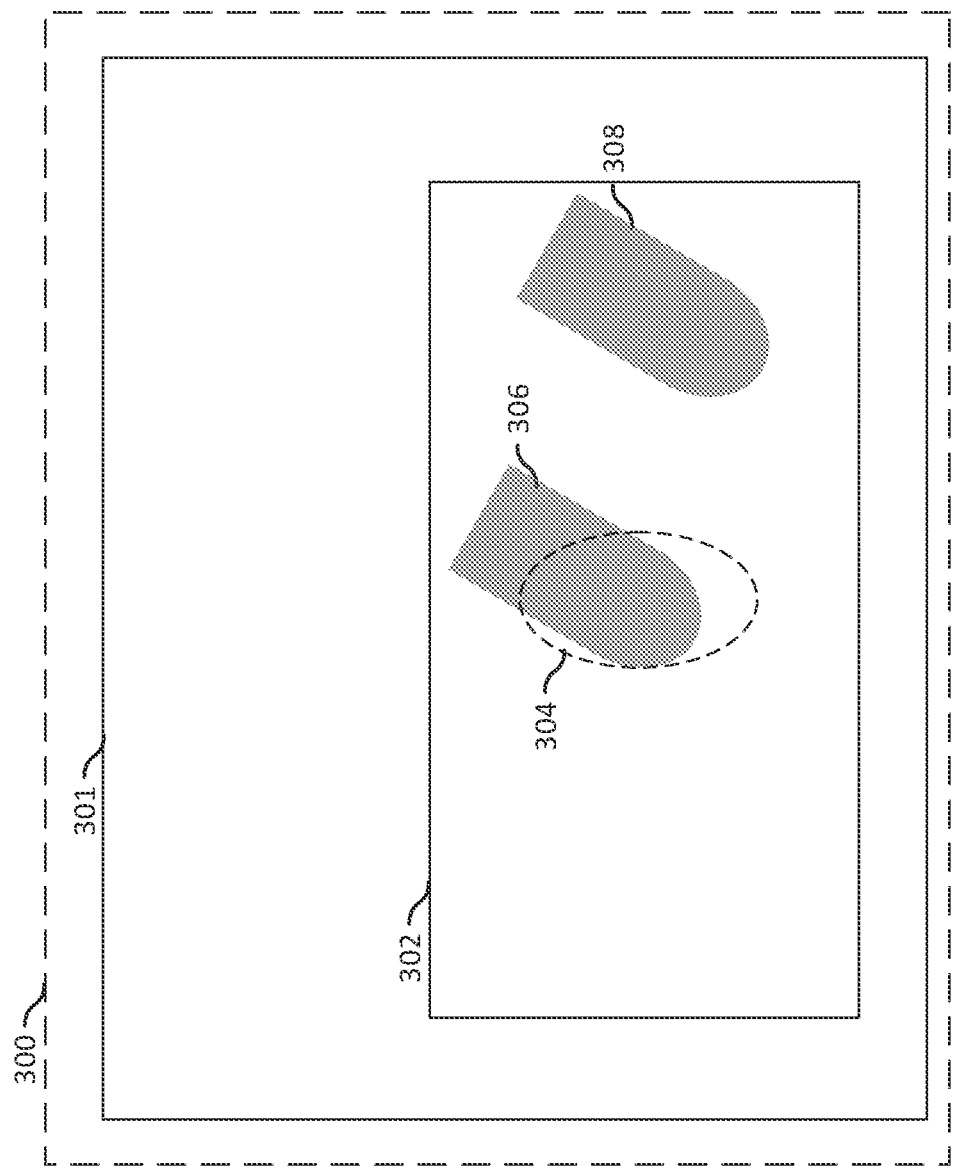
FIG. 3 is an illustrative diagram of a coordinate check method with example touch events in accordance with some embodiments.

FIG. 3 is a diagram illustrating a coordinate check example like is illustrated in the gesture detection method of FIGS. 2A-2B. In FIG. 3, the electronic device 300 has a touch panel 301 that has a track region 302 defined around a fingerprint sensing region 304. The coordinate check looks to see if a finger touch event is within the fingerprint sensing region 304. An example finger touch 306 is depicted to occur within the fingerprint sensing region 304, and would be determined to have touch coordinates within the fingerprint sensing region 304. Therefore, the example finger touch 306 would pass the coordinate check. A different example finger touch 308 is depicted to occur outside of the fingerprint sensing region 304, and would be determined to not possess touch coordinates within the fingerprint sensing region 304. Therefore, example finger touch 308 would not pass the coordinate check (as a result of being completely outside of the fingerprint sensing region 304).

Figure 4A:
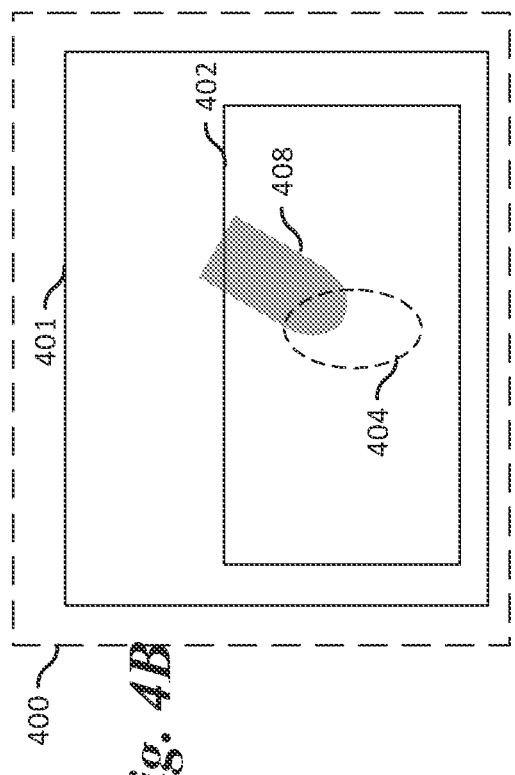
FIGS. 4A-4C are illustrative diagrams of an area check method with example touch events in accordance with some embodiments.
Figure 4B:
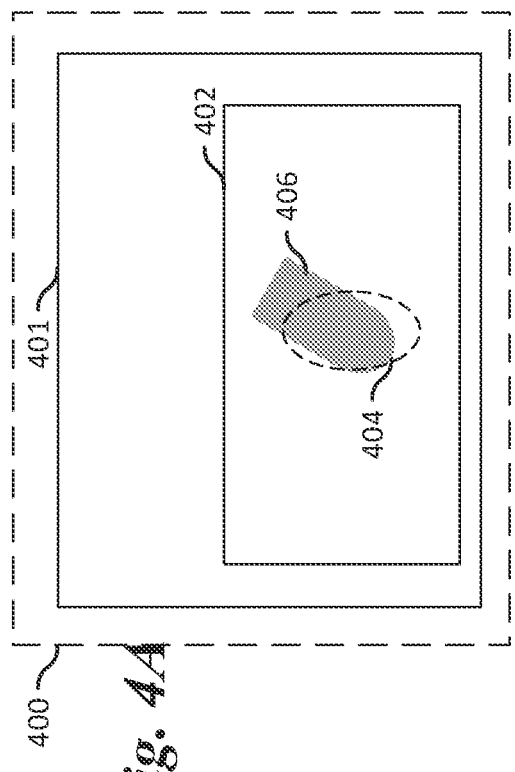
Figure 4C:
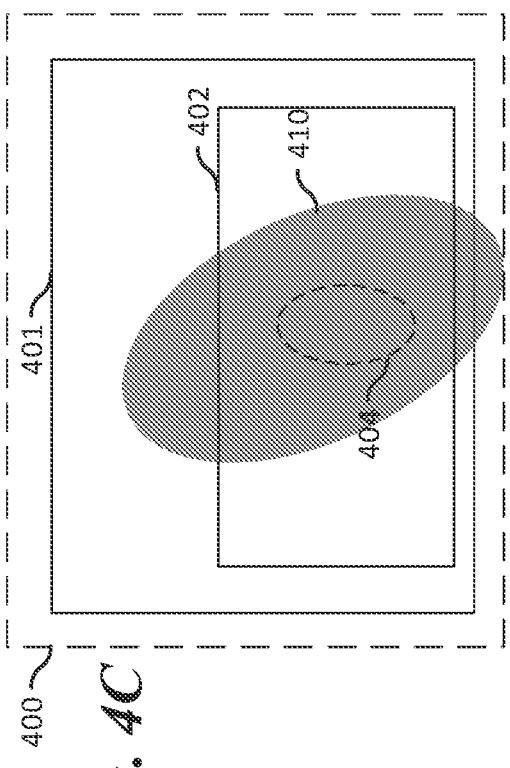

The gesture detection method benefits from the inclusion of the coordinate check (like is depicted in FIG. 3). Further improvement is made to the gesture detection method by the implementation of an area check. FIG. 4A-4C illustrates various example touch events and their corresponding areas, as well as how the area check would classify the corresponding touch event.

FIG. 4A is a diagram illustrating an area check example like what is implemented in the gesture detection method of FIGS. 2A-2B. The area check makes a judgment on whether the touch is an intentional touch by quantifying the area of the touch within the fingerprint sensing region 404, and the track region 402 (which is defined within the touch panel 401). For an intentional touch, most of the touch area should be within the fingerprint sensing region 404. In FIG. 4A, the area check performed would look at the amount of area of the fingerprint sensing region 404 that is covered by the touch. For the touch event to be classified as passing the area check, there are two conditions that must be satisfied. The first condition is that the amount of area of the fingerprint sensing region 404 covered by the touch area 406 must be larger than a predefined number, such as 40%, 50%, 75%, or 90% of the fingerprint sensing region 404. The second condition of the area check would compare the amount of the touch area that is within the track region 402 to the total touch area 406. If the percentage of the touch area that is within the track region is lower than a second predefined number, such as 40%, 50%, or 65%, the second condition is satisfied. If both of these conditions are satisfied, then the touch event would pass the area check. According to the area check, the touch event that produced the touch area 406 would be labeled a valid finger touch, and a valid attempt to unlock the electronic device because a quantifiable amount of area is covered by the touch in the fingerprint sensor, and a non-significant amount of the track region is covered by the touch area.

FIG. 4B is a diagram illustrating an area check example like what is implemented in the gesture detection method of FIGS. 2A-2B. In FIG. 4B, the area of the fingerprint sensing region 404 that is covered by the touch area 408 is determined. This may be performed using techniques such as capacitive sensing, e.g., mutual and/or self sensing in certain embodiments. The touch panel 401 has the track region 402 defined within it. The area of the fingerprint sensing region 404 occupied by the touch area 408 is compared with the total area of the fingerprint sensing region 404 to determine a fractional occupancy of the fingerprint sensing region 404. If the fractional occupancy is lower than a predefined number such as 50%, 75%, or 95%, the touch is labeled as an invalid finger touch because the majority of the fingerprint sensing region 404 is not covered by the touch area 408, thus not passing the area check, so this touch event would be a failed unlock attempt of the electronic device.

FIG. 4C is a diagram illustrating an area check example like what is implemented in the gesture detection method of FIGS. 2A-2B. In contrast to the example of FIG. 4B, an area check performed on this example would yield very different results. As in the prior example, the device 400 includes a track region 402 defined within the touch panel 401, and a fingerprint sensing region 404. However, the user's touch occupies a touch area 410. The touch area 410 that is within the track region 402 is much larger than the area of the fingerprint sensing region 404 covered by the touch. The occupancy fraction for this case is much higher than 1. Thus, although the fingerprint sensing region 404 is completely covered (and would pass the first condition of the area check), it is clear that the touch covers a large amount of the track region 402. Based on this, it appears that the user did not intend to unlock the device (or access the fingerprint sensor), and therefore this reading is likely due to a mistouch by a much larger object than a finger (e.g., a palm). As a result, the area check would not be passed and the gesture detection method would label the touch event as an invalid unlock attempt. Thus in various embodiments, in response to determining that the fractional occupancy is larger than a second threshold such as 1, 1.1, 1.2, or 1.5, the intent of the user is assumed to be to not touch the fingerprint sensing region 404.

To clarify the purpose of the area check, in the present embodiment, the area check made in box 212, box 214, and box 216 of FIG. 2A is used to filter the meaningless touch events with excessively large or excessively small touch areas, in order to filter more types of potential meaningless touch events. The filtering of meaningless touch events is further addressed via imposing the condition that any removal of the touch event from the touch panel will send the method from box 216 into the INVALID STATE (box 218) without waiting to see if the finger potentially moves back into the fingerprint sensor region in a subsequent scan (this behavior virtually never happens and the system benefits more from its exclusion, rather than the inclusion of the possibility in the gesture detection method (this scenario is detailed above in the discussion of FIG. 1C)). Therefore, compared to a more conventional gesture detection method, the present embodiment can effectively filter more types of meaningless touch events. As a result of a more effective filter for mistouch events, the electronic device will not receive as many invalid wake up signals, which will help the electronic device to conserve battery power.

FIG. 5 illustrates a component schematic of an electronic device 500 having a touch sensitive display with a fingerprint sensor that is configured to detect and differentiate various types of contact using a gesture detection method stored in the memory (firmware) of the device in accordance with an embodiment of the invention. FIG. 5 illustrates that the electronic device 500 may include a processor 510, a sensor 520, a display 540, a touch panel 550, a fingerprint sensor 560, and a memory 530, which may be electronically coupled to each other through a bus.

The memory 530 may be programmed for short term and/or long term memory storage. The memory 530 may comprise various programs to be executed in the processor 510. The memory 530 may include both volatile and non-volatile memories. The memory 530 is designed to retain information generated by the processor 510 so it can be recalled at a later time. The memory 530 may also store a mistouch filtering algorithm (such as the flowchart depicted in FIG. 2) for use in mistouch detection by the processor 510 based on the touch panel 550 sensor information from the sensor 520.

The touch panel and fingerprint sensor of the electronic device are designed to register user input via touches made to its surface. FIG. 5 depicts a scenario where a display 540, a touch panel 550, and a fingerprint sensor 560 are integrated in one component. In other embodiments, the touch panel 550, fingerprint sensor 560, and display 540 may be separate components. The sensor 520 may include the touch panel and fingerprint sensor as well as other sensors such as gyroscopes, accelerometers, ambient light sensors, various photo sensors. One or more of the sensors may be integrated together. In an embodiment, the touch panel 550 may include a touch sensor as well.

The processor 510 analyzes information and carries out a series of executable scripts, e.g., stored in the memory 530, based on user input. The processor 510 may comprise an application-specific integrated circuit (ASIC) device, a system on chip (SOC), or any other processing unit known in the art. In various embodiments, the processor 510 may comprise a number of separate computing units such as cores integrated within one processor, or distinct separate processing chips. In other embodiments, some of the processing may be integrated with the sensor 520.

As is described above, the processor 510 when executed analyzes groupings of touch values produced from a matrix of touch sensitive area in the touch panel. Information gathered from the sensor 520 and the touch panel 550 (which is integrated with the display 540 in this depiction) is used to determine if the analyzed touch values define a valid touch event within the fingerprint sensor 56o to potentially unlock the electronic device. FIG. 6 is a flow chart illustrating embodiments of the present disclosure.

In an embodiment, a method includes detecting a touch on a touch panel, where the touch covers an area of the touch panel (box 610). The method includes determining whether the touch is within a track region that surrounds a fingerprint sensing region (box 620). The method includes determining whether the touch is within the fingerprint sensing region (box 630). The method includes determining a first fraction of the fingerprint sensing region covered by the touch and determining whether the first fraction exceeds a first threshold (box 640). The first threshold may be a majority, e.g., substantially a major part such as a plurality, of the fingerprint sensing region. For example, in an embodiment, the first threshold may be about 40% of the fingerprint sensing region, and exceed 50% in an embodiment.

The method includes determining a second fraction of all of the area that is within the fingerprint sensing region and determining whether the second fraction exceeds a second threshold (box 650). The second threshold is a fraction indicative of a majority, e.g., substantially a major part such as a plurality, of an area associated with the corresponding touch, in this case the first area. For example, in an embodiment, the second threshold may be about 40%, and exceed 65% in an embodiment.

The method includes based on determining that the second fraction exceeds the second threshold, determining whether the first touch is valid (box 660).

The various boxes described above may be implemented as further described using FIG. 2A above. For example, in an embodiment, box 620 may be implemented as box 212 in FIG. 2A.

Example embodiments of the invention are described below. Other embodiments can also be understood from the entirety of the specification as well as the claims filed herein.

Example 1. A gesture detection method includes detecting at a first time a first touch on a touch panel, where the first touch covers a first area of the touch panel. The method includes determining whether the first touch is within a track region that surrounds a fingerprint sensing region; and in response to determining that the first touch is within the track region, determining whether the first touch is within the fingerprint sensing region, the fingerprint sensing region including a sensing surface of a fingerprint sensor. The method includes in response to determining that the first touch is within the fingerprint sensing region, determining a first fraction of the fingerprint sensing region covered by the first touch and determining whether the first fraction exceeds a first threshold. The first threshold is a majority of the fingerprint sensing region. The method includes in response to determining that the first fraction exceeds the first threshold, determining a second fraction of all of the first area that is within the fingerprint sensing region and determining whether the second fraction exceeds a second threshold, where the second threshold is a fraction indicative of a majority of an area associated with the corresponding touch. The method includes based on determining that the second fraction exceeds the second threshold, determining whether the first touch is valid.

Example 2. The gesture detection method of example 1, further includes reporting the first touch as an invalid touch in response to determining that the second fraction does not exceed the second threshold.

Example 3. The gesture detection method of one of examples 1 or 2, further includes reporting the first touch as an invalid touch in response to determining that the first touch is moving outside of the fingerprint sensing region and then moving back inside of the fingerprint sensing region.

Example 4. The gesture detection method of one of examples 1 to 3, further includes in response to reporting the first touch as valid, determining a second touch covering a second area of the touch panel at a second time, and determining whether the second touch is valid.

Example 5. The gesture detection method of one of examples 1 to 4, where determining whether the second touch is valid includes determining that a third fraction of the fingerprint sensing region covered by the second touch exceeds the first threshold, determining that a fourth fraction of all of the second area that is within the fingerprint sensing region exceeds the second threshold, and determining a first overlap of the first touch with the second touch is more than a third threshold.

Example 6. The gesture detection method of one of examples 1 to 5, further includes in response to reporting the first touch and the second touch as valid, determining a third touch covering a third area of the touch panel at a third time, and determining whether the third touch is valid.

Example 7. The gesture detection method of one of examples 1 to 6, where determining whether the third touch is valid includes: determining that a fifth fraction of the fingerprint sensing region covered by the third touch exceeds the first threshold; determining that a sixth fraction of all of the third area that is within the fingerprint sensing region exceeds the second threshold; and determining a second overlap of the second touch with the third touch is more than the third threshold.

Example 8. The gesture detection method of one of examples 1 to 7, further includes in response to determining that the first touch, the second touch, and the third touch are valid, waking up an electronic device.

Example 9. The gesture detection method of one of examples 1 to 8, where the first threshold exceeds 50% of the fingerprint sensing region, the second threshold exceeds 65% of the associated first, second, or third area, and the third threshold exceeds 90%.

Example 10. The gesture detection method of one of examples 1 to 9, further includes reporting the first touch as an invalid touch in response to determining that the first touch has left the touch panel.

Example 11. An electronic device includes a touch panel and a fingerprint sensor, and a processor coupled to a memory storing a program comprising instructions to be executed in the processor. The instructions when executed cause the processor to detect a first touch on a touch panel, the first touch covering a first area of the touch panel. The program includes instructions to define a track region that surrounds a fingerprint sensing region on the touch panel, and determine whether the first touch is within the track region that surrounds the fingerprint sensing region. The program includes instructions to in response to determining that the first touch is within the track region, determine whether the first touch is within the fingerprint sensing region, where the fingerprint sensing region includes a sensing surface of a fingerprint sensor. The program includes instructions to in response to determining that the first touch is within the fingerprint sensing region, determine a first fraction of the fingerprint sensing region covered by the first touch and determine whether the first fraction exceeds a first threshold, the first threshold being a majority of the fingerprint sensing region, and in response to determining that the first fraction exceeds the first threshold, determine a second fraction of all of the area that is within the fingerprint sensing region and determine whether the second fraction exceeds a second threshold. The second threshold is a fraction indicative of a majority of an area associated with the corresponding touch. The program includes instructions to based on determining that the second fraction exceeds the second threshold, determine whether the first touch is valid.

Example 12. The device of example 11, where the instructions when executed further cause the processor to report the first touch as an invalid touch in response to determining that the second fraction does not exceed the second threshold.

Example 13. The device of one of examples 11 or 12, where the instructions when executed further cause the processor to report the first touch as an invalid touch in response to the first touch moving outside of the fingerprint sensing region and then moving back inside of the fingerprint sensing region.

Example 14. The device of one of examples 11 to 13, where the instructions when executed further cause the processor to, in response to reporting the first touch as valid, determine a second touch covering a second area of the touch panel at a second time, and determine whether the second touch is valid.

Example 15. The device of one of examples 11 to 14, where the instructions to determine whether the second touch is valid include instructions to: determine that the second touch is valid in response to determining a third fraction of the fingerprint sensing region covered by the second touch exceeds the first threshold, a fourth fraction of all of the second area that is within the fingerprint sensing region exceeds the second threshold, and a first overlap of the first touch with the second touch is more than a third threshold.

Example 16. The device of one of examples 11 to 15, where the instructions when executed further cause the processor to, in response to reporting the first touch and the second touch as valid, determine a third touch covering a third area of the touch panel at a third time, and determine whether the third touch is valid.

Example 17. The device of one of examples 11 to 16, where the instructions to determine whether the third touch is valid include instructions to: determine that the third touch is valid in response to determining that a fifth fraction of the fingerprint sensing region covered by the third touch exceeds the first threshold; a sixth fraction of all of the third area that is within the fingerprint sensing region exceeds the second threshold; and a second overlap of the second touch with the third touch is more than the third threshold.

Example 18. The device of one of examples 11 to 17, where the instructions when executed further cause the processor to, in response to determining that the first touch, the second touch, and the third touch are valid, wake up an electronic device.

Example 19. The device of one of examples 11 to 18, where the instructions when executed further cause the processor to determine the first threshold exceeds 50% of the fingerprint sensing region, the second threshold exceeds 65% of the associated first, second, or third area, and the third threshold exceeds 90%.

Example 20. The device of one of examples 11 to 19, where the instructions when executed further cause the processor to report the touch as an invalid touch in response to determining that the touch has left the electronic device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A gesture detection method comprising:
    detecting at a first time a first touch on a touch panel, the first touch covering a first area of the touch panel;
    determining whether the first touch is within a track region that surrounds a fingerprint sensing region;
    in response to determining that the first touch is within the track region, determining whether the first touch is within the fingerprint sensing region, the fingerprint sensing region comprising a sensing surface of a fingerprint sensor;
    in response to determining that the first touch is within the fingerprint sensing region, determining a first fraction of the fingerprint sensing region covered by the first touch and determining whether the first fraction exceeds a first threshold, the first threshold being a majority of the fingerprint sensing region;
    in response to determining that the first fraction exceeds the first threshold, determining a second fraction of all of the first area that is within the fingerprint sensing region and determining whether the second fraction exceeds a second threshold, the second threshold being a fraction indicative of a majority of an area associated with the corresponding touch; and
    based on determining that the second fraction exceeds the second threshold, determining whether the first touch is valid.

2. The gesture detection method of claim 1, further comprising reporting the first touch as an invalid touch in response to determining that the second fraction does not exceed the second threshold.

3. The gesture detection method of claim 1, further comprising reporting the first touch as an invalid touch in response to determining that the first touch is moving outside of the fingerprint sensing region and then moving back inside of the fingerprint sensing region.

4. A gesture detection method comprising:
    detecting at a first time a first touch on a touch panel, the first touch covering a first area of the touch panel;
    determining whether the first touch is within a track region that surrounds a fingerprint sensing region;
    in response to determining that the first touch is within the track region, determining whether the first touch is within the fingerprint sensing region, the fingerprint sensing region comprising a sensing surface of a fingerprint sensor;
    in response to determining that the first touch is within the fingerprint sensing region, determining a first fraction of the fingerprint sensing region covered by the first touch and determining whether the first fraction exceeds a first threshold, the first threshold being a majority of the fingerprint sensing region;
    in response to determining that the first fraction exceeds the first threshold, determining a second fraction of all of the first area that is within the fingerprint sensing region and determining whether the second fraction exceeds a second threshold, the second threshold being a fraction indicative of a majority of an area associated with the corresponding touch;
    based on determining that the second fraction exceeds the second threshold, determining whether the first touch is valid; and
    in response to reporting the first touch as valid, determining a second touch covering a second area of the touch panel at a second time, and determining whether the second touch is valid.

5. The gesture detection method of claim 4, wherein determining whether the second touch is valid comprises:
    determining that a third fraction of the fingerprint sensing region covered by the second touch exceeds the first threshold,
    determining that a fourth fraction of all of the second area that is within the fingerprint sensing region exceeds the second threshold, and
    determining a first overlap of the first touch with the second touch is more than a third threshold.

6. The gesture detection method of claim 5, further comprising in response to reporting the first touch and the second touch as valid, determining a third touch covering a third area of the touch panel at a third time, and determining whether the third touch is valid.

7. The gesture detection method of claim 6, wherein determining whether the third touch is valid comprises:
    determining that a fifth fraction of the fingerprint sensing region covered by the third touch exceeds the first threshold;
    determining that a sixth fraction of all of the third area that is within the fingerprint sensing region exceeds the second threshold; and
    determining a second overlap of the second touch with the third touch is more than the third threshold.

8. The gesture detection method of claim 6, further comprising in response to determining that the first touch, the second touch, and the third touch are valid, waking up an electronic device.

9. The gesture detection method of claim 5, wherein the first threshold exceeds 50% of the fingerprint sensing region, the second threshold exceeds 65% of the associated first, second, or third area, and the third threshold exceeds 90% overlap.

10. The gesture detection method of claim 1, further comprising reporting the first touch as an invalid touch in response to determining that the first touch has left the touch panel.

11. An electronic device comprising:
a touch panel and a fingerprint sensor;
a processor coupled to a memory storing instructions to be executed in the processor, the instructions when executed cause the processor to:
  detect a first touch on the touch panel, the first touch covering a first area of the touch panel;
  define a track region that surrounds a fingerprint sensing region on the touch panel;
  determine whether the first touch is within the track region that surrounds the fingerprint sensing region;
  in response to determining that the first touch is within the track region, determine whether the first touch is within the fingerprint sensing region, the fingerprint sensing region comprising a sensing surface of a fingerprint sensor;
  in response to determining that the first touch is within the fingerprint sensing region, determine a first fraction of the fingerprint sensing region covered by the first touch and determine whether the first fraction exceeds a first threshold, the first threshold being a majority of the fingerprint sensing region; and
  in response to determining that the first fraction exceeds the first threshold, determine a second fraction of all of the area that is within the fingerprint sensing region and determine whether the second fraction exceeds a second threshold, the second threshold being a fraction indicative of a majority of an area associated with the corresponding touch; and
  based on determining that the second fraction exceeds the second threshold, determine whether the first touch is valid.

12. The device of claim 11, wherein the instructions when executed further cause the processor to report the first touch as an invalid touch in response to determining that the second fraction does not exceed the second threshold.

13. The device of claim 11, wherein the instructions when executed further cause the processor to report the first touch as an invalid touch in response to the first touch moving outside of the fingerprint sensing region and then moving back inside of the fingerprint sensing region.

14. The device of claim 11, wherein the instructions when executed further cause the processor to, in response to reporting the first touch as valid, determine a second touch covering a second area of the touch panel at a second time, and determine whether the second touch is valid.

15. The device of claim 14, wherein the instructions to determine whether the second touch is valid comprise instructions to:
  determine that the second touch is valid in response to determining:
    a third fraction of the fingerprint sensing region covered by the second touch exceeds the first threshold,
    a fourth fraction of all of the second area that is within the fingerprint sensing region exceeds the second threshold, and
    a first overlap of the first touch with the second touch is more than a third threshold.

16. The device of claim 15, wherein the instructions when executed further cause the processor to, in response to reporting the first touch and the second touch as valid, determine a third touch covering a third area of the touch panel at a third time, and determine whether the third touch is valid.

17. The device of claim 16, wherein the instructions to determine whether the third touch is valid comprise instructions to:
  determine that the third touch is valid in response to determining that:
    a fifth fraction of the fingerprint sensing region covered by the third touch exceeds the first threshold;
    a sixth fraction of all of the third area that is within the fingerprint sensing region exceeds the second threshold; and
    a second overlap of the second touch with the third touch is more than the third threshold.

18. The device of claim 16, wherein the instructions when executed further cause the processor to, in response to determining that the first touch, the second touch, and the third touch are valid, wake up an electronic device.

19. The device of claim 15, wherein the instructions when executed further cause the processor to determine the first threshold exceeds 50% of the fingerprint sensing region, the second threshold exceeds 65% of the associated first, second, or third area, and the third threshold exceeds 90% overlap.

20. The device of claim 11, wherein the instructions when executed further cause the processor to report the first touch as an invalid touch in response to determining that the first touch has left the electronic device.

\* \* \* \* \*